United States Patent Office 3,448,681
Patented June 10, 1969

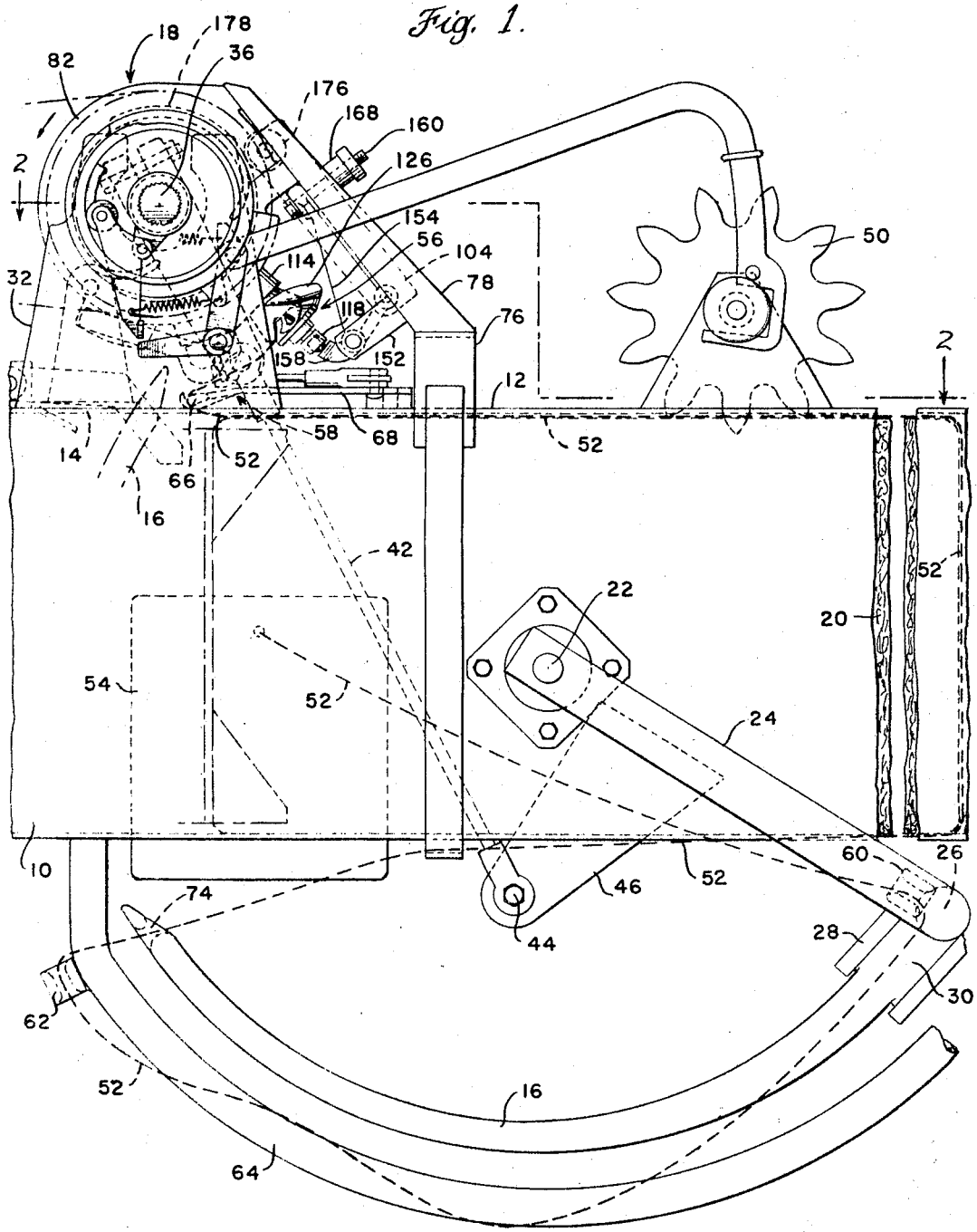

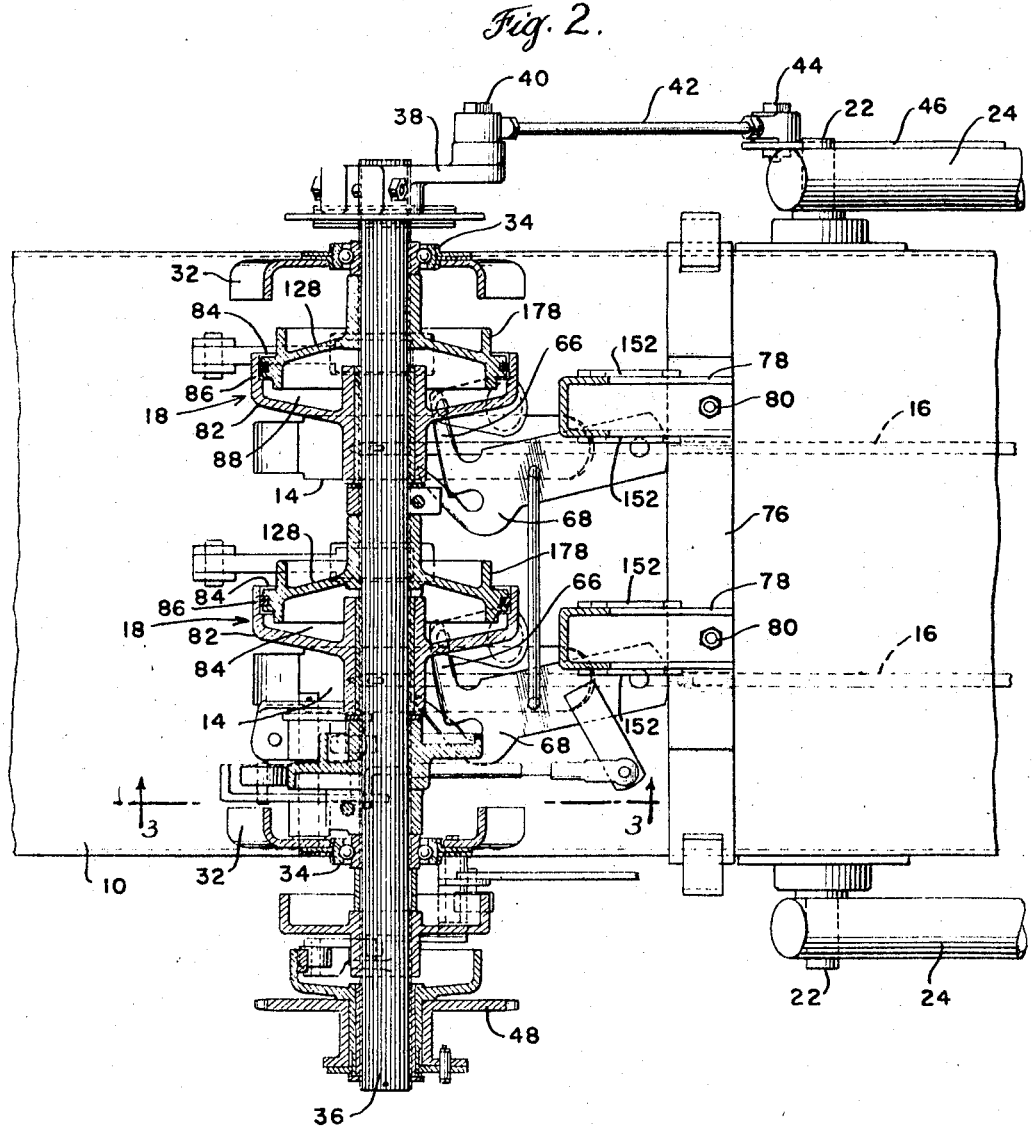

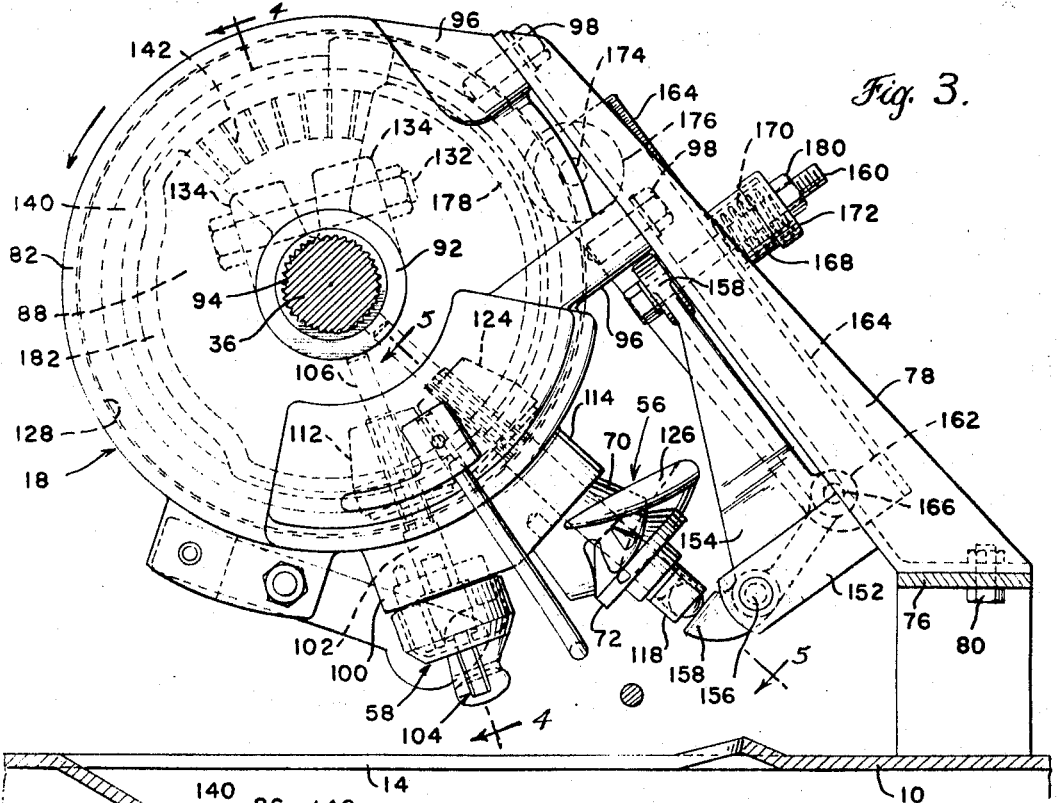
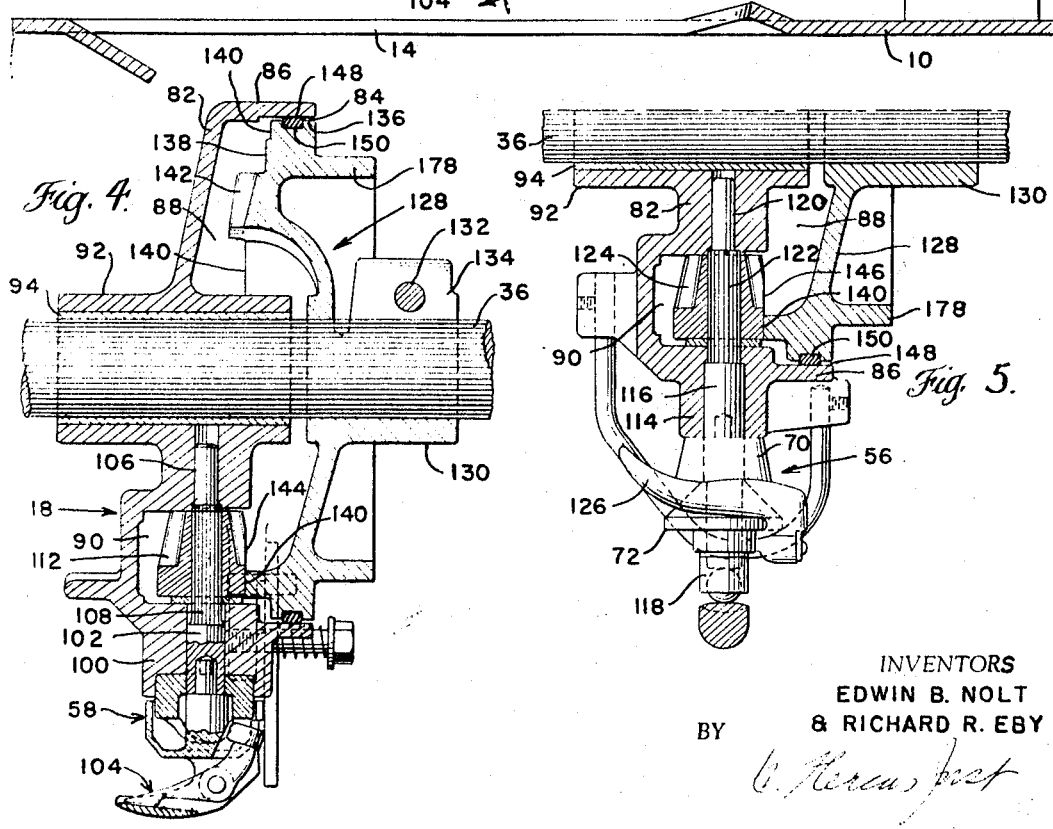

3,448,681
GEAR HOUSING FOR TIER ASSEMBLY OF BALER
Edwin B. Nolt, New Holland, and Richard R. Eby, Ephrata, Pa., assignors to Sperry Rand Corporation, New Holland, Pa., a corporation of Delaware
Filed Aug. 16, 1967, Ser. No. 661,096
Int. Cl. B65b 13/08, 13/28, 57/10
U.S. Cl. 100—22                                              10 Claims

ABSTRACT OF THE DISCLOSURE

A tier assembly for a baler of the type forming loops of twine, wire or like strands to tie bales and comprising the combination of a housing having a cavity extending inward from an opening in one side thereof, means supporting the housing upon a bale case, a bearing within said housing supporting a rotatable drive shaft, twine knotter and clamping units at least one of which has a driven shaft extending into said housing cavity, driven gear means within said cavity connected to said driven shaft, a closure member complementary to said opening in said housing and connected to said drive shaft for rotation of the closure member in slidable sealing engagement with the periphery of said opening in said housing, and driving gear means on the inner surface of said closure member engaging said driven gear means to actuate said driven shaft when said drive shaft rotates said closure member, whereby said coengaging gear means are enclosed within said cavity against access to the atmosphere.

Cross-reference to related application

This application comprises one of a series respectively directed to various improvements in the tier assembly mechanism of a baler. Said various improvements, though cooperating with each other to produce a desired, combined and ultimate result in operation of the tier assembly mechanism, nevertheless are of an independent nature particularly with regard to patent classification, whereby a series of applications have been filed respectively covering said improvements which, at least to some extent, have been made by different inventors.

Background of the invention

Balers which employ twine, wire or like strands to tie compressed bales of hay and similar material, have been available for many years. Such equipment has been provided with tier mechanisms which have included relatively movable members which operate to clamp the outer end of a strand of twine, for example, which is supplied from a ball thereof, the mechanism including means to extend a strand around a bale of material and bring a loop of said twine into engagement with a knotter unit adjacent the clamping means which results in cutting a strand and tying the opposite ends thereof into a firm knot. With wire, the operation is the same except that the ends of the strands are usually fastened by twisting them together.

Various types of toothed gear means, linkage, rotatable shafts and the like have been devised to operate the strand arranging and tying mechanisms and units. Typical examples of such actuating mechanisms are disclosed in Patent No. 512,762, to Stewart and 615,815, to Dennis. It is apparent from these mechanisms that the gears and other types of toothed equipment, linkages and shafts are of the exposed type. Incident to the baling operations performed by such mechanisms, pieces of the material being tied by such twine accumulate in various portions of the mechanism and become enmeshed between the coengaging teeth of the gear means. This may result in malfunctioning of the equipment, but in any event wear thereof.

Summary of the invention

The principal purpose of the present invention is to provide in the tier assembly mechanism for a baler which employs twine, wires or like strands to tie bales, housing means which encloses the driving and driven gear means of the tier and clamping units of a baler of the type to which the present invention pertains, whereby especially the coengaging gear means not only are maintained free from contact by the outside atmosphere but, in particular, are operated with freedom from contact by extraneous material of the type with which the baler is employed in the tying operation thereof. Further, in such housing arrangement, certain elements serve dual functions in a manner not heretofore employed in similar mechanisms.

It is another object of the invention to provide a housing which preferably comprises a casting having a cavity extending inward from an opening in one side thereof, and a rotatable closure having a periphery complementary to the periphery of said opening, rotatably supported for movement relative to the periphery of said opening in a slidably sealable manner, while the aforementioned gear means are maintained within said cavity of said housing in the manner set forth.

It is a further object of the invention to provide a bearing in the wall of said housing which forms the inner extremity of the cavity to rotatably support a drive shaft extending therethrough, said closure member also being fixed to said drive shaft for movement therewith when said shaft rotates within the bearing relative to said housing which is supported in stationary manner upon the case of a baler.

Still another object of the invention is to provide compressing means for certain cooperating elements of the clamping unit of the baler, linkage means being arranged to engage a shaft of said clamping unit and urge the same axially inward to affect the desired clamping of a strand of twine thereby, said linkage means being actuated by external cam means which preferably are integral with said closure member for said opening in said housing and said closure member, on the inner surface thereof, carrying driving gear means for actuation of driven gears for said knotter and clamping units.

Ancillary to the foregoing object, it is another object of the invention preferably to form said closure member for said opening of said housing as a unitary casting upon which the driving gear means are formed integrally and are of an arcuate, segmental nature, while said cam means are formed integrally with and project axially outward from the opposite face of said closure from which said segmental gear means project, said closure also having hub means of a nature readily to be clamped firmly to the driving gear which extends through said hub.

A still further object of the invention is to provide a closure means with a circular outermost periphery which is complementary to and slidably and rotatably moves within a circular band-like extremity on said housing which defines said opening therein, and gasket means are carried by an appropriate seat within one of said members to effect a lubricant-retaining seal for the coengaging gear means enclosed within the cavity of said housing when said closure member is mounted in operative position with respect thereto upon said drive shaft.

Details of the invention and other objects thereof are described in the following specification and illustrated in the accompanying drawings comprising a part thereof.

Brief description of the drawings

FIG. 1 is a fragmentary side elevation of the bale case portion of a baler upon which a knotter assembly is mounted which embodies the principles of the invention.

FIG. 2 is a fragmentary plan view, partly in horizontal section, and illustrating details of two knotter mechanism assemblies mounted upon the top of a case of a baler, generally as seen upon the lines 2—2 of FIG. 1.

FIG. 3 is an enlarged fragmentary vertical sectional view illustrating details of one of the knotter assemblies shown in FIGS. 1 and 2, as seen on the lines 3—3 of FIG. 2.

FIG. 4 is a fragmentary vertical sectional view of the knotter assembly shown in FIG. 3, as seen on the lines 4—4 of said figure.

FIG. 5 is a fragmentary radial sectional view of part of the knotter assembly shown in FIG. 3 as seen on the lines 5—5 of said figure.

*Description of the preferred embodiments*

In the drawings, tier means in the form of twine knotters are shown; and in the description the invention is described in relation to twine tiers. It is to be understood, however, that the invention is applicable to wire tier mechanisms, as shown for example in U.S. Patent No. 3,068,781.

A fragmentary portion of a substantially horizontal case 10 of a baler of the type to which the present invention pertains is shown in FIGS. 1–3. The top 12 of said case is provided with a plurality of longitudinally extending slot-type openings 14 through which the terminal, outer end of an arcuate twine needle 16 extends, as shown in fragmentary, phantom manner in FIG. 1, during part of the operating cycle of the knotter assembly 18, details of which are described hereinafter.

The bale case 10 preferably is substantially rectangular in cross-section and the inner surfaces determine the shape of a bale 20, of hay or the like, which is shown fragmentarily in FIG. 1 through the foreshortened illustration of the case 10 adjacent the right hand end thereof in said figure. Mounted on the opposite side walls of the case 10 are substantially horizontal trunnions 22. Extending radially from said trunnions and pivotally supported at one end thereby is a needle yoke having a pair of arms 24, the outer ends of which are secured to a horizontal bar 26 provided with a securing bracket means 28 or the like to which the base end of the twine needles 16 is secured by any appropriate means, the same preferably affording a limited amount of adjustment. It will be understood that a plurality of bracket means 28 are provided in transversely spaced relationship upon the bar 26 in order that a plurality of twine needles 16 may be supported by bar 26, as shown in FIG. 2. Each of the knotter assemblies has a needle 16 associated therewith.

Extending upward from the top 12 of case 10, respectively adjacent opposite sides thereof is a pair of vertical standards or brackets 32 having appropriate bearings 34 in the upper ends thereof which respectively rotatably support a horizontal timer drive shaft 36. A crank 38, best shown in FIG. 2, is clamped to one end of drive shaft 36 and has a crank pin 40 projecting from the outer end thereof for pivotal connection to one end of a connecting rod 42. The opposite end of connecting rod 42 is pivotally connected by a bolt 44, or the like, which extends outward from an actuating ear 46 which is fixed securely, such as by welding or the like, to one of the radial arms 24.

During the operating cycle of the baler in which operation of the knotter assemblies occurs which embody the principles of the present invention, the drive shaft 36 is actuated by drive means which include sprocket gear 48 for example, shown in FIG. 2, and otherwise, includes additional driving mechanism, not shown, deriving its power from suitable means such as power take off of a tractor connected to the baler and operable to move the same around a hay field. It will be understood that the baler preferably is of the portable type, whereby the case 10 is supported by conventional wheels, not shown.

During the operating cycle, which is controlled by clutch means C not comprising part of the present invention, but actuated by star or meeting wheel 50 and trip arm 51, FIG. 1, the shaft 36 is rotated very quickly through a single revolution and then is abruptly stopped. The time involved is usually less than one second and all of the knotting operations of a plurality of strands of twine about a completed bale occur during that brief interval.

Referring to FIG. 1, a single strand of twine 52 is illustrated by a dotted line and is shown somewhat in outline manner in said figure disposed within its path of travel from the supply container 54 to the terminal clamped end thereof which is engaged by the clamping unit 56 adjacent the knotter unit 58, as best shown in FIG. 3. It thus will be seen that the twine extends from a supply ball or the like, of many feet of such twine, within container 54, through a guide loop 60 on bar 26, loosely beneath the twine needle 16 to another guide loop 62 supported upon an arcuate guard member 64 which is fixed at its upper ends to the bottom of case 10 for example.

The strand of twine 52 then extends along the lower part of the bale 20, upwardly along the leading face thereof and then rearwardly along the top of the bale being formed, all as clearly shown by the dotted line in FIG. 1, and then around an ear 66 on twine finger 68, as shown in FIGS. 1 and 2, until the actual terminal end of the strand of twine is clamped between the relatively stationary and movable clamping members 70 and 72 of the clamping unit 56, as seen in FIG. 5.

As the bale 20 is progressively formed by the operation of feeding mechanism, not shown, and plunger P the forward end of the bales continues to move toward the right as viewed in FIG. 1 and carries with it the strand of twine 52 extending around the forward face thereof described above. Such movement of the bale operates star wheel 50 and, in accordance with conventional operation of balers of this type, when the desired size of the bale has been formed, as controlled by the movement of star wheel 50, the trip arm 51 actuates clutch C and the operating cycle of the knotter assemblies 18 and the associated twine needles 16 thereof is instituted.

When such operation occurs, the tip end of each needle 16, containing an eye 74 through which the twine 52 extends, is rapidly moved upwardly to and beyond the phantom fragmentary position thereof shown in FIG. 1, until said tip end actually is slightly past the clamping unit 56. This carries the twine 52 around the trailing end of the formed bale and into association with the knotter unit 58, for purposes of tying the trailing end of the bale-encircling strand of twine to the leading, clamped end thereof engaged by clamping unit 56.

The knotter assemblies 18 are fixedly supported upon the top 12 of case 10 by a transverse bracket 76 to which the lower end of a diagonally extending rigid arm 78 is fixed by bolts 80 or the like. Each knotter assembly 18 also comprises a knotter frame casting 82 which, as best seen from FIGS. 2 and 4, is cup-shaped and terminates at one side in a substantially planar opening 84 which is defined preferably by a band-like, circumferential wall 86 as best shown in FIG. 4. The casting 82 actually comprises a housing within which a cavity 88 is formed, the same extending axially inward from the opening 84. Further with reference to FIG. 4, it will be seen that cavity 88, adjacent the lower portion thereof, as viewed in said figure, is provided with a lateral extension 90. Also, the end wall of the housing casting 82 which defines the innermost extremity of cavity 88 is provided with a transversely extending bearing 92 of appreciable length which rotatably receives a bearing sleeve 94 which has a smooth cylindrical exterior surface and a longitudinally splined interior surface complementary to the exteriorly splined surface of drive shaft 36, as clearly shown in all the figures.

Each of the knotter frame castings and housings 82 are provided with appropriate attaching projections 96 which have outer surfaces complementary to the inner face of each rigid arm 78 and suitable openings in said arm receive clamping bolts 98, see FIG. 3, which are threaded into suitable tapped holes in the projections 96 to firmly and fixedly connect the knotter frame castings and housings 82 non-rotatably with respect to the bale case 10 and in fixed relation thereto.

Each knotter frame casting 82 also is provided preferably with a radially extending projection or boss 100 within which a radially extending bearing bore is formed to rotatably receive a complementary shaft 102 therein. Said shaft supports the principal members of the knotter unit 58 including the bill hook assembly 104 which, during the operating cycle of the knotter unit 58, is rotated about the axis of shaft 102. The upper, innermost end of shaft 102 has a reduced diameter and is rotatable within another radial bore 106 formed in casting 82, the same being coaxial with the bearing bore in boss 100.

Intermediately of the ends of shaft 102, the same is provided circumferentially with parallel splines 108 which are complementary to the inner surface of an axial opening formed in pinion gear 112 which preferably is a bevel type. The complementary splined surfaces of the gear 112 and shaft 100 prevent relative rotation therebetween.

Directly connected to the boss 100 is another similar boss 114 which has a radial bore therethrough to receive another rotatable shaft 116 therein which comprises part of the clamping unit 56. The outer end of said shaft has a terminal extension 118 thereon, for purposes to be described. Immediately adjacent the same, the movable clamping member 72 is fixedly connected to said shaft 116 for rotatable and limited longitudinal movement of member 72 relative to the stationary clamping member 70 which immediately abuts the outer end of boss 114 and is suitably keyed thereto to prevent rotatable movement with respect to the boss.

As in regard to the knotter unit 58, the innermost end of shaft 116 of the clamping unit is received within a radial bore 120 which is coaxial with and axially spaced from the bearing bore in boss 114. The intermediate portion of shaft 116 is provided, preferably around its entire circumference, with parallel splines 122 which are disposed within and are complementary to the inner surface of the axial opening formed in pinion gear 124 which, like gear 112, preferably is a similar bevel gear.

From FIGS. 3–5, it will be seen that the shafts 102 and 116 extend radially from the axis of drive shaft 36 and, especially from FIGS. 4 and 5, it will be seen that the axes of shafts 102 and 116 are substantially perpendicular to the axis of drive shaft 36. During the aforementioned single rotation of drive shaft 36 during the operating cycle of the knotter assembly, the driven, radially extending shafts 102 and 116 of the knotter and clamping unit also are rotated a single revolution to effect the respective functions of said units by means of the bevel pinion gears 112 and 124 of said units. It will be seen that the gears 112 and 124 respectively are positioned within the lateral extension or offset portion 90 of the cavity 88 within each of the housings comprising the knotter frame castings 82. The shaft 102 of the knotter assembly 58 primarily is for purposes of revolving the bill hook assembly 104, while the rotatable function of shaft 116 of the clamping unit 56 is for purposes of revolving arcuate twine guide hook 126 which preferably is integral with movable clamping member 72 of said unit so as to insure proper engagement of the trailing portion of a strand of twine by the bale hook assembly 104 of the knotter unit 58.

The opening 84 in each housing comprising knotter frame casting 82 preferably is circular and, as indicated above, is defined by the band-like circumferential wall 86, the inner surface of which preferably is machined to insure smooth circular accuracy of the opening 84. Said opening is closed by a closure member 128 which, in its preferred construction, comprises a unitary casting having a plurality of means thereon respectively to perform different but necessary and related functions contributing to the overall operation, especially, of the knotter and clamping units of the knotter assemblies 18.

The closure member 128 is provided, centrally thereof, with a hub 130, the interior of which is preferably complementary to the exterior of the circumferentially splined drive shaft 36, so as to permit very close adjustment in arranging the position of the various operating elements, to be described, upon closure member 128, with respect to the portions of the mechanism to be actuated thereby. When desired adjustment has been effected between closure member 128 and shaft 36, said member is firmly clamped upon shaft 36 by a clamping bolt 132 which extends between radial ears 134 defining the opposite sides of a radial slot extending entirely through one wall of hub 130.

The outer periphery 136 of closure member 128 preferably is cylindrical and is closely complementary to the inner surface of the circumferential wall 86 defining opening 84. The inner surface 138 of closure member 128, which directly faces the cavity 88 in the housing comprising casting 82 and which actually defines one wall of said cavity, is shaped so as to provide a circular planar surface 140 which is perpendicular to the axis of drive shaft 36 and is disposed a limited distance radially inward from the peripheral surface 136 of closure member 128. Also projecting axially inward from surface 138 is an arcuate segmental gear means 142 which is positioned slightly radially inward from the circular planar surface 140, as can be best seen from FIG. 3.

The segmental gear means 142 are beveled so as to be complementary to the bevel pinion gears 112 and 124 of the knotter and clamping units so as to be coengageable therewith during a portion of the rotation of the closure member 128 by drive shaft 36. The arcuate extent of the segmental gear means 142 is exactly sufficient to revolve the pinion gears 112 and 124 one complete revolution and then disengage the same during the remainder of the rotative movement of closure member 128 with respect to the housing comprising casting 82 of each of the knotter assemblies 18.

With reference to FIG. 4 in particular, it will be seen that the plane of the surface 140 is substantially coextensive with the roots of the teeth of the segmental gear means 142 and said planar surface 140 is interrupted between opposite ends of the segmental gear means 142 in order insure engagement of gear means 142 with the pinion gears 112 and 124. After rotation of said gears has been achieved by the segmental gear means 142, it is the additional function of the surface 140 to maintain gears 112 and 124 immovable rotatably. This is accomplished by each of the gears 112 and 124 respectively being provided with a flat surface 144 and 146 as readily seen in FIGS. 4 and 5. These flat surfaces are substantially tangential respectively upon the gears 112 and 124 and are within planes parallel to the axes of the shafts 102 and 116 respectively of the knotter and clamping units 58 and 56.

The relatively close circular space between the inner surface of circumferential wall 86 on casting 82 and the outer periphery 136 of closure member 128, which is complementary thereto, is sealed by a circular gasket 148 which preferably is disposed within an annular groove 150 formed in the peripheral surface 136 of closure member 128. The gasket has wiping contact with the inner surface of circumferential wall 86 of casting 82 and thereby effectively seals the interior of cavity 88 against the ingress of outside atmosphere as well as extraneous matter such as chaff, shreds and bits of the material being baled, slivers and pieces of twine, and otherwise. Further, the cavity 88 is capable of retaining appropriate lubricant for the rotatable shafts 102 and 116 within their bearing bores, as well as to lubricate the gears 112 and 124, the teeth of the segmental gear means 142, and the cooperating bearing surfaces between sleeve 94 and bearing 92 of the casting 82. To achieve this, the gasket 148 should preferably be formed of lubricant-retaining material of appropriate nature.

Closure member 128 also serves an additional function, particularly with respect to the clamping unit 56, particularly in regard to providing effective clamping engagement between the surfaces of the stationary and movable clamping members 70 and 72 thereof. As indicated hereinabove, the shaft 116 of said unit has a terminal extension 118 thereon, the purpose and function of which will now be described.

The terminal extension 118 on shaft 116 of the clamping unit 56 preferably is rounded and, for example, may comprise a hardened steel ball of the type employed in ball bearings, the same being suitably mounted for rotation in an anti-friction manner. A pair of short parallel arms 152 are fixed to and extend perpendicularly from the inner face of rigid arm 78 of each of the knotter assemblies 18 so as to form a somewhat U-shaped bracket between which one end of a lever 154 is disposed and is pivotally connected therebetween by a pin 156, as best shown in FIG. 3. Lever 154 has a lateral extension 158 thereon which abuts the terminal extension 118 of shaft 116. The opposite end 159 of lever 154 is disposed within a plane extending transversely to that of lever 154 which preferably is formed from sheet metal or the like, and said extension is provided with a bore which receives bolt 160.

Intermediately of the opposite ends of lever 154, the same is provided with an extension 162, shown in FIG. 3, which has a bearing opening therethrough parallell to the axis of pin 156. Said extension is disposed between the opposite parallel side flanges of a channel-shaped lever 164 and a transverse pin 166 extends between said extension 162 and the opposite flanges of lever 164 to pivotally connect said extension 162 of lever 154 thereto. The connecting portion between the side flanges of lever 164 is provided with a circular collar 168 which projects perpendicularly outward therefrom to receive a coiled compression spring 170.

The inner end of said spring abuts the outer face of the connecting web between the side flanges of lever 164 and the opposite end thereof abuts a cap 172. Said connecting web of lever 164 is bored to receive bolt 160 therethrough and said bolt is coaxial with collar 168. The bolt also extends through a complementary hole in the center of cap 172. Normally, the inner surface of cap 172 does not abut the outer end of collar 168, whereby limited compression and expansion movements of spring 170 is permitted to provide corresponding limited movement between the opposite end 158 of lever 154 and the channel-shaped lever 164. Also extending between the side flanges of channel-shaped member 164 is a transverse pintle 174 which rotatably supports a follower roller 176.

Formed preferably integrally with the closure member 128 and projecting axially, exteriorly from the outer surface of said member, which is opposite that surface from which the segmental gear means 142 projects, is a continuous flange comprising a cam 178. The circumferential outer surface of said flange comprises the actual cam surface 178 and said surface is engaged by the follower roller 176 on lever 164.

As particularly is seen from FIG. 3, the major portion of the circumferential extent of cam 178 is cylindrical, such extent amounting to approximately 270°. During the time that the follower roller 176 is engaging said major cylindrical portion of cam 178, the laterally extending end 158 of lever 154 will exert compression in an axial direction, radially inward, upon the terminal extension 118 of shaft 116 of the clamping unit 56. Limited yieldability in said clamping force is provided by means of the spring 170 to permit a small amount of relative movement between the end 158 of lever 154 and the channel shaped lever 164 which supports the follower roller 176. An adjustable nut 180 affords adjustment of the compressive force of spring 170 and thus variability in the tension exerted by lateral extension 158 upon shaft 116. When such compressive force is exerted by lateral extension 158, the movable clamping member 72 will be moved axially into firm clamping engagement with the relatively fixed clamping member 70 of clamping unit 56.

During the intended operation of the knotter unit 58, particularly after a knot has been tied thereby, it is essential that the terminal end of the strand of twine which is being tied around the bale 20 and which, meanwhile, has been clamped between members 70 and 72 of clamping unit 56, be released, especially at the time when the completed bale is to proceed in ejecting direction through the case 10 of the baler and the formation of a new bale is to be instituted. Accordingly, when such release of the terminal, leading end of each strand of twine is to be released as aforesaid, it is necessary that the compression exerted axially upon the shaft 116 be momentarily released. This is accomplished by providing a relief portion 182 in the cam flange 178, said relief portion being best shown in FIG. 3.

From FIG. 3, it will be seen that the relief portion of cam flange 178 extends through an arc of substantially 90° and except for the ends of said relief portion 182 which connect it to the main cylindrical portion of cam 178, the radial dimension of the relief portion 182 is uniform but is less than the radial dimension of the principal or major portion of the cam flange 178. Such arrangement of the relief portion 182 thus releases the compressive tension of movable clamping member 72 of clamping unit 56 with respect to the stationary clamping member 70 and thus permits the removal of the previously clamped end of a strand of twine from between said clamping members. Instantly thereafter, the newly arranged leading terminal end of the next strand of twine to be formed around a new bale is inserted between the clamping members and, by the time this occurs, the trailing end of the relief portion 182 of the cam flange 178 is brought into engagement with follower roller 176 which is moved to restore the compression axially against the terminal end of shaft 116 by means of the movement of lateral extension 158 on lever 154.

From the foregoing, it thus will be seen that the closure member 128 serves a plurality of functions, including the sealing of the internal cavity 88 against the ingress of extraneous matter and the retention of lubricant therein; support and operate the arcuate segmental gear means 142 for purposes of actuating the rotatable shafts of the knotter and clamping uints 58 and 56, preferably in the order recited; and support and actuate the external cam 178 for purposes of providing and relieving the desired clamping force between the clamping members of the clamping unit 56. Such arrangement provides trouble-free periods of long duration by maintaining the actuating gear means in the best possible condition for unfailingly operating the driving and actuating mechanism of the knotter and clamping units without the attending difficulties recited hereinabove which exist in knotter mechanisms of the types currently used.

What is claimed is:

1. A tier assembly for baler utilizing loops of twine, wire or the like strands to tie bales and comprising in combination, a housing having a cavity extending inward from an opening in said housing, means to support said housing upon a bale case, said housing having a bearing in one wall thereof, a drive shaft rotatably supported in said bearing for movement relative to said housing, strand tying and clamping units one of which at least has a driven shaft extending into said cavity in said housing, driven gear means within said cavity in said housing and connected to said driven shaft to actuate the same, a closure member for said opening complementary thereto and connected to said drive shaft for rotation thereby relative to said opening in movable sealing engagement therewith and having an inner surface facing said cavity, and driving gear means on said inner surface of said closure member engaging said driven gear means of said tier thereof when said drive shaft moves relative to said housing to drive said closure member.

2. The tier assembly according to claim 1 in which said closure member and opening in said housing are circular and have complementary slidably engageable surfaces.

3. The tier assembly according to claim 2 in which the periphery of said closure member is slidably positioned within the periphery of said opening in said housing.

4. The tier assembly according to claim 3 in which one of said peripheries is provided with a seat, and said assembly further including a circular gasket positioned within said seat and slidably engageable with said other periphery to provide a lubricant seal.

5. The tier assembly according to claim 1 in which said driving gear means is arcuate and segmental, whereby the same drives said driven gear only during a portion of a complete revolution of said closure member relative to said opening in said housing.

6. The tier assembly according to claim 1 in which said housing comprises a metal casting having a bearing opening formed therein extending radially from said drive shaft to support said driven shaft in substantially perpendicular relationship to the axis of said drive shaft.

7. The tier assembly according to claim 6 in which said housing is cup-shaped and said cavity therein has an offset portion therein extending axially to said drive shaft from said opening in said housing to provide accommodation for the driven gear means on said driven shaft, and said opening in said housing being defined by an uninterrupted bandlike circular ring which slidably receives the outer periphery of said closure member.

8. The tier assembly according to claim 1 in which said closure member and housing opening are circular and the outer periphery of said closure rotatably and slidably fits within the periphery of said opening in said housing, and said tier assembly further including compression means supported adjacent said housing and operable to engage the outer end of a shaft of said clamping unit to provide clamping force by said unit relative to the end of a strand when engaged thereby, said compression means comprising linkage means having a member engaging said outer end of said shaft of said clamping unit to actuate the same axially, said closure member for said housing having an inner face directed toward said cavity in said housing and an opposite outer face, said driving gear means being formed on said inner face of said closure member, and cam means being connected to the outer face of said closure member and arranged exteriorly of said cavity of said housing and having a cam surface engageable with a portion of said linkage means to actuate the same and exert clamping force axially against said shaft of said clamping unit during at least a portion of said movement of said closure means by said drive shaft when revolved.

9. The tier assembly according to claim 8 in which said closure member comprises a casting having a hub formed integrally therewith and including means to clamp the same non-rotatably upon said drive shaft.

10. The tier assembly according to claim 9 in which said drive gear means is arcuate and segmental and spaced radially inward from the periphery of said closure member, a portion of said inner face of said closure member adjacent the periphery thereof being circular and planar, and said driven gear means being spur-type and provided with a tangential flat outer surface portion parallel to the axis of said gear and comprising a positioning surface slidably engaged by said circular planar face portion of said closure member during the portion of the rotation thereof when said drive gear means is not in engagement with the teeth of said driven gear means, thereby to prevent rotation of said driven gear means during such non-driving engagement of said driven gear means by said drive gear means.

References Cited

UNITED STATES PATENTS 3,086,450    4/1963    Tarbox _____ 100—22

FOREIGN PATENTS 568,647    4/1945    Great Britain.

BILLY J. WILHITE, *Primary Examiner.*

U.S. Cl. X.R.

100—4, 31